United States Patent [19]

Sedlak

[11] Patent Number: 4,720,644
[45] Date of Patent: Jan. 19, 1988

[54] LAVET STEPPING MOTOR WITH U-SHAPED COIL CORE

[75] Inventor: Adolf Sedlak, Wurmberg 2, Fed. Rep. of Germany

[73] Assignee: Timex Corporation, Waterbury, Conn.

[21] Appl. No.: 863,752

[22] Filed: May 16, 1986

[30] Foreign Application Priority Data

Jul. 27, 1985 [DE] Fed. Rep. of Germany ... 8521736[U]

[51] Int. Cl.$^4$ ............................................. H02K 37/00
[52] U.S. Cl. .................................. 310/49 R; 310/162
[58] Field of Search ........................... 310/49, 162–165

[56] References Cited

U.S. PATENT DOCUMENTS

| | | | |
|---|---|---|---|
| 4,262,223 | 4/1981 | Cleusix | 310/49 |
| 4,277,704 | 7/1981 | Giger et al. | 310/49 |
| 4,473,766 | 9/1984 | Obergfell et al. | 310/49 X |

Primary Examiner—Donovan F. Duggan
Attorney, Agent, or Firm—William C. Crutcher

[57] ABSTRACT

A stator for a stepping motor of an electric watch comprises an elongated yoke member having a free end, a coil arm integrally formed on the other end of the yoke member and having a free end, an exciter coil arranged on the coil arm by being pushed onto this coil arm from the free end thereof, and a bridge member connecting the free ends of the yoke member and the coil arm, the yoke member with the coil arm and the bridge member hereby being flat elements made of a magnetizable sheet metal. In accordance with the invention, the coil arm is of a greater length then the exciter coil and the bridge member rests flat on the free ends of the yoke member and the coil arm and areally overlaps regions of these elements.

1 Claim, 1 Drawing Figure

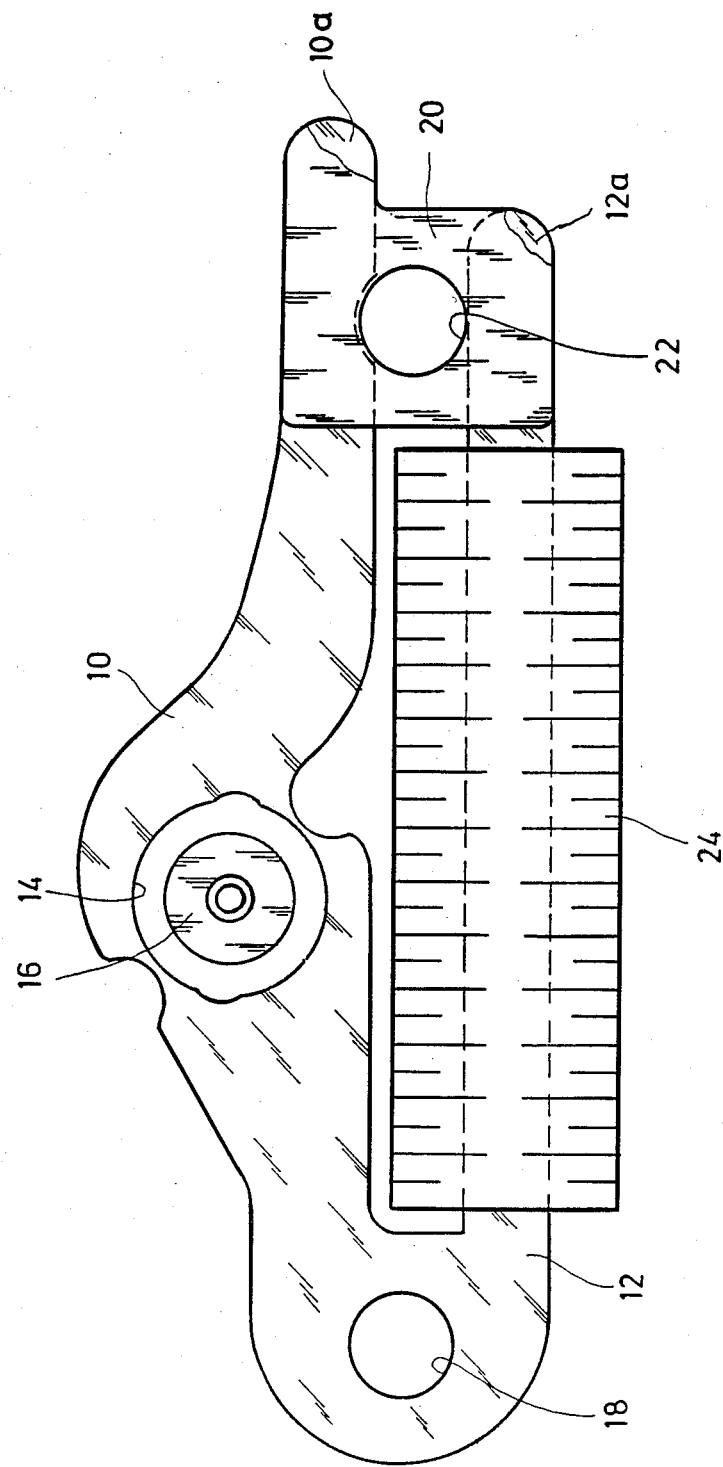

LAVET STEPPING MOTOR WITH U-SHAPED COIL CORE

BACKGROUND OF THE INVENTION

The invention relates to a stator for a stepping motor of an electric watch comprising an elongated yoke member having a free end, a coil arm integrally formed on the other end of the yoke member and having a free end, an exciter coil arranged on the coil arm by being pushed onto the coil arm from the free end thereof, and also comprising a bridge member connecting the free ends of the yoke member and the coil arm, the yoke member with the coil arm and the bridge member hereby being flat elements made of a magnetizable sheet metal.

A stator of this type is known, for example, from French laid-open paper FR-OS 24 51 653. The construction of the stator plate of the known stator is advantageous in so far as it offers the possibility of pushing the finished coil, e.g. an exciter coil wound onto a coil core, onto the coil arm from its free end. This means that the coil may be produced on customary winding machines and need not be wound on the stator itself. The known stator uses a basically L-shaped bridge, the short arm of which has an inclined face butt-jointed to a corresponding inclined face of the yoke. The long arm of the bridge, which also has an inclined face, projects into the interior of the coil where its inclined face is butt-jointed to a corresponding inclined fact at the free end of the coil arm.

This known solution for the construction of a stator has the disadvantage that the magnetic path of the stator which must pass across the yoke, the coil arm and the bridge to close the magnetic circuit has a badly defined magnetic conductance, which is often too low, in the regions of the contact points between the bridge, on the one hand, and the yoke and the coil arm, on the other. The problems associated therewith are aggravated by the fact that the contact point between the coil arm and the long arm of the bridge is located in the interior of the coil and is not, therefore, visible when the bridge is assembled. This may result in inaccuracies during assembly of the known stator arrangement, in addition to the fundamental shortcoming resulting from the two butt joints. Any errors occurring during assembly will later impair the operation of the stepping motor, the rotor of which is generally arranged in a circular recess in the yoke. Moreover, the constructional design of the known stator has an additional disadvantage. The pointed ends of the various parts of the stator, which are usually punched form transformer sheets or the like, may entail the risk of injury to personnel during assembly and also increase the risk of the exciter winding of the coil being damaged by the sharp ends of the transformer parts if these are handled carelessly. This can result in, for example, a short-circuit in the coil or an interruption.

Proceeding on the basis of the state of the art and the problems discussed above, the object of the invention is to improve a stator of the type described at the outset such that a good, uniform magnetic conductance is maintained along the closed magnetic path of the stator.

This object is accomplished according to the invention, for a stator of the type described at the beginning, in that the coil arm is of a greater length than the exciter coil and that the bridge member rests flat on the free ends of yoke member and coil arm and overlaps regions of these elements to form an areal contact.

SUMMARY OF THE INVENTION

An essential advantage of the inventive stator is the fact that the coil arm projects freely beyond the end of the exciter coil pushed onto the coil arm. This means that the bridge member merely needs to be placed flat on the free ends of the yoke member and the coil arm and secured in position relative to these parts. The aforesaid parts overlap each other areally to such an extent that a good magnetic conductance is maintained at all events at the points of connection or rather in the areas of connection. The inventive construction of the stator has the additional advantage that the bridge member may, for example, be riveted to the free ends of the yoke member and the coil arm so as to lie flat on them without it being necessary to keep to narrow tolerances, which is the case when butt-jointing the inclined faces of the known stator.

It is particularly advantageous, in a stator constructed in accordance with the invention, for the free end of the coil arm and possibly the free end of the yoke member, as well, to be rounded. The rounded free end of the coil arm reduces or rather avoids damage to the exciter coil while the rounded free end of the yoke member additionally reduces the risk of injury during assembly.

DRAWING

The invention will now be explained in more detail on the basis of a single drawing showing a plan view of a preferred embodiment of an inventive stator with an exciter coil slipped onto the coil arm.

DESCRIPTION OF THE PREFERRED EMBODIMENT

The drawing shows, in detail, a stator comprising an elongated yoke member 10 with a coil arm 12 integrally formed on one end thereof. The yoke member 10 and the coil arm 12 may therefore be punched simultaneously from a sheet of magnetizable material. At the same time, a rotor opening 14 for accommodating a rotor 16 of the stepping motor may be punched into the yoke member 10 along with a mounting opening 18. Furthermore, the stator shown in the drawing has a bridge member 20 which can also be punched out of magnetizable sheet metal and in which a mounting opening 22 is provided.

During assembly of the stator arrangement shown in the drawing, an exciter coil 24 is pushed onto the coil arm 12. The exciter coil is illustrated schematically in the drawing in its operating position and usually comprises a coil core, onto which an exciter winding is wound. As the exciter coil 24 is shorter than the coil arm 12, the end 12a of the coil arm 12 projects freely beyond the coil. This end is rounded in accordance with the invention. The free end 10a of the yoke member 10 is also rounded in a corresponding manner.

Once the exciter coil 24 has been pushed onto the coil arm, the yoke member 10 is mounted on a plate, in particular a movement plate of a watch movement, by means of, for exmaple, a mounting screw penetrating the mounting opening 18. Subsequently, the bridge member 20 is placed on the free ends 10a, 12a of the yoke member 10 and the coil arm 12, respectively, such that its mounting opening 22 is located over a corresponding threaded bore or the like in the said plate (which is not illustrated). By tightening the mounting screw, the bridge member 20 may now be tightened against the free ends 10a, 12a until it abuts on these parts to form an areal contact and thereby ensures that the magnetic path has good conductance over the gap between yoke member 10 and coil arm 12 which is provided to allow the exciter coil 24 to be slipped onto the coil arm.

In this embodiment, the bridge member 20 is designed such that its outer edge exactly follows the outer contours of the free ends 10a, 12a of the yoke member 10 and the coil arm 12, respectively. In this way, a maximum areal overlap is attained. The bridge member 20 could, however, be designed as a substantially rectangular component part, preferably having rounded edges.

The foregoing description clearly shows that the inventive construction creates, on the one hand, a flawless magnetic path without narrow tolerances having to be adhered to while, on the other hand, avoiding sharp edges, in particular slanted points, on the component parts of the stator. In this way, the risk of injury during assembly and the risk of damaging the exciter coil 24 are reduced to a minimum.

The latter is of especially great importance when the exciter coil is not wound on a core but as a so-called air coil which is produced by winding wire onto a winding mandrel and then subjecting this wire to heat treatment so that the individual windings of the coil are bonded to one another to form a self-supporting coil.

What is claimed is:

1. A stator for a stepping motor of an electric watch comprising an elongated yoke member having a first free end, said yoke member defining a first mounting opening opposite said first free end, a coil arm of substantially uniform width integrally formed on the other end of said yoke member and having a second rounded free end, an exciter coil comprising a self-supporting air coil arranged on said coil arm by being pushed onto said coil arm from said second free end thereof, and also comprising a bridge member connecting said free ends of said yoke member and said coil arm, said yoke member with said coil arm and said bridge member hereby being flat elements made of a magnetizable sheet metal, characterized in that said coil arm is of a greater length than said exciter coil and that said bridge member defines a second mounting opening and rests flat on said free ends of yoke member and coil arm and areally overlaps regions of these elements whereby said mounting plate may be tightened against said first and second free ends with a mounting screw to ensure a magnetic path of good conductance in said regions and wherein said yoke defines a rotor opening opposite a mid portion of said exciter coil and disposed between said mounting openings.

* * * * *